(12) United States Patent
Daga et al.

(10) Patent No.: US 11,671,467 B2
(45) Date of Patent: Jun. 6, 2023

(54) AUTOMATED SESSION PARTICIPATION ON BEHALF OF ABSENT PARTICIPANTS

(71) Applicant: Avaya Management L.P., Durham, NC (US)

(72) Inventors: Navin Daga, Silapathar (IN); Sandesh Chopdekar, Pune (IN); Pushkar Yashavant Deole, Pune (IN)

(73) Assignee: Avaya Management L.P., Morristown, NJ (US)

( * ) Notice: Subject to any disclaimer, the term of this patent is extended or adjusted under 35 U.S.C. 154(b) by 9 days.

(21) Appl. No.: 17/357,150

(22) Filed: Jun. 24, 2021

(65) Prior Publication Data
US 2022/0417297 A1 Dec. 29, 2022

(51) Int. Cl.
| | |
|---|---|
| H04L 65/1089 | (2022.01) |
| H04L 51/043 | (2022.01) |
| H04L 51/02 | (2022.01) |
| H04L 65/1093 | (2022.01) |
| H04M 3/56 | (2006.01) |
| G10L 15/26 | (2006.01) |
| G10L 13/02 | (2013.01) |

(Continued)

(52) U.S. Cl.
CPC ........ *H04L 65/1089* (2013.01); *G06F 40/103* (2020.01); *G10L 13/02* (2013.01); *G10L 15/22* (2013.01); *G10L 15/26* (2013.01); *H04L 51/02* (2013.01); *H04L 51/043* (2013.01); *H04L 65/1093* (2013.01); *H04M 3/42221* (2013.01); *H04M 3/568* (2013.01); *H04M 2201/39* (2013.01)

(58) Field of Classification Search
CPC ... H04L 65/1089; H04L 51/02; H04L 51/043; H04L 65/1093; G06F 40/103; G10L 13/02; G10L 15/22; G10L 15/26; H04M 3/42221; H04M 3/568; H04M 2201/39
See application file for complete search history.

(56) References Cited

U.S. PATENT DOCUMENTS

| | | | |
|---|---|---|---|
| 8,510,399 B1 * | 8/2013 | Byttow | H04L 12/1822 707/771 |
| 8,700,719 B1 * | 4/2014 | Covitz | G06Q 10/107 709/204 |

(Continued)

OTHER PUBLICATIONS

Call and online meeting bots, Nov. 10, 2021. 5 pages. Downloaded from "https://docs.microsoft.com/en-us/microsoftteams/platform/bots/calls-and-meetings/calls-meetings-bots-overview," on Dec. 20, 2021.

(Continued)

*Primary Examiner* — Akelaw Teshale (57) ABSTRACT

The technology disclosed herein enables an absent participant to participate in a communication session. In a particular embodiment, a method includes identifying a meeting for an automated attendee to attend on behalf of a user. At a time for the meeting, the method includes joining the automated attendee to a communication session for the meeting. In the automated attendee, the method provides monitoring, in real-time, user communications exchanged between two or more other users over the communication session. During the monitoring, upon identifying a portion of the user communications that is relevant to the user, the method provides notifying the user about the portion.

20 Claims, 8 Drawing Sheets

(51) Int. Cl.
     *G10L 15/22*      (2006.01)
     *G06F 40/103*      (2020.01)
     *H04M 3/42*      (2006.01)

(56) References Cited

U.S. PATENT DOCUMENTS

| | | | |
|---|---|---|---|
| 10,542,143 B2* | 1/2020 | Segalis | H04M 3/42042 |
| 10,827,064 B2* | 11/2020 | Segalis | H04M 3/42093 |
| 2011/0107236 A1* | 5/2011 | Sambhar | H04M 3/563 |
| | | | 715/753 |
| 2017/0006069 A1* | 1/2017 | Srivastava | H04L 65/1069 |
| 2018/0137470 A1* | 5/2018 | Donnelly | H04W 4/44 |

OTHER PUBLICATIONS

"Calls and online meetings bots", downloaded from "https://docs.microsoft.com/en-us/microsoftteams/platform/bots/calls-and-meetings/calls-meetings-bots-overview," Jun. 17, 2021, 5 pages.

* cited by examiner

AUTOMATED SESSION PARTICIPATION ON BEHALF OF ABSENT PARTICIPANTS

TECHNICAL BACKGROUND

It has become increasingly likely that a user will have conflicting entries in their schedule, especially now that most meetings can take place remotely over audio/video communication sessions. With the potential for numerous meetings to be scheduled for a user on any given day, there is a lessening likelihood that the user can attend all of the meetings. Meetings can overlap in the user's schedule or the user may be unable to attend a meeting for some other reason, such as network issues preventing the user from joining a conference session. Also, even if a user is able to attend all meetings (e.g., because none of the meetings overlap), the user may not be needed for the entirety of a meeting. For instance, the user may be scheduled on a meeting to provide a project status update, which will only take up a small portion of a much longer meeting. In that case, it is an inefficient use of the user's time to have the user attend the entirety of the meeting just to listen for when the user's input is requested.

SUMMARY

The technology disclosed herein enables an absent participant to participate in a communication session. In a particular embodiment, a method includes identifying a meeting for an automated attendee to attend on behalf of a user. At a time for the meeting, the method includes joining the automated attendee to a communication session for the meeting. In the automated attendee, the method provides monitoring, in real-time, user communications exchanged between two or more other users over the communication session. During the monitoring, upon identifying a portion of the user communications that is relevant to the user, the method provides notifying the user about the portion.

In some embodiments, the method includes, prior to the time, receiving input from the user describing information that the user considers relevant; and identifying the portion based on the information. In those embodiments, the method may include accessing a user profile for the user and identifying the portion based on the user profile.

In some embodiments, the method includes, after identifying the portion, inserting predefined input into the user communications, wherein the predefined input comprises text or a voice recording. In those embodiments, the predefined input may comprise text and inserting the predefined input may include inserting the text into a chat channel of the communication session. Alternatively, the predefined input may comprise text and inserting the predefined input may include synthesizing speech from the text and playing the speech over the communication session.

In some embodiments, in the automated attendee, the method includes generating a transcript of the user communications and providing the transcript to the user. In those embodiments, the transcript may be provided to the user in real-time and notifying the user about the portion may include highlighting the portion within the transcript during presentation of the transcript in real-time to the user.

In some embodiments, after notifying the user, the method may include receiving input from the user for inclusion in the user communications, wherein the predefined input comprises text or a voice recording, and including the input in the user communications. In those embodiments, including the input in the user communication may occur in real time with the receipt of the input from the user. Also, in those embodiments, including the input may include notifying a meeting moderator about the input and inserting the input into the user communications upon receiving an indication from the meeting moderator allowing insertion of the input. Further, in those embodiments where the input comprises text, including the input may include synthesizing speech from the text and playing the speech over the communication session.

In some embodiments, the method includes identifying the portion based on the user communications including a name of the user.

In another embodiment, an apparatus includes one or more computer readable storage media and a processing system operatively coupled with the one or more computer readable storage media. Program instructions stored on the one or more computer readable storage media, when read and executed by the processing system, direct the apparatus to identify a meeting for an automated attendee to attend on behalf of a user. At a time for the meeting, the program instructions direct the processing system to join the automated attendee to a communication session for the meeting and monitor, in real-time, user communications exchanged between two or more other users over the communication session. During the monitoring, upon identifying a portion of the user communications that is relevant to the user, the program instructions direct the processing system to notify the user about the portion.

DETAILED DESCRIPTION

The automated attendee systems described below join communication sessions to attend meetings on behalf of users that do not intend to attend the meetings personally (e.g., are unavailable, have a conflict, do not want to attend personally, etc.). After identifying a meeting that the automated attendee system will attend on behalf of a user, the automated attendee system joins a communication session for the meeting. The automated attendee system monitors the real-time communications exchanged during the session to identify a portion of the communications that is relevant to the absent user. The automated attendee system notifies the user about the portion of communications so that, while the user is not attending the meeting personally, the user is still notified, in substantially real-time, when something relevant is discussed during the meeting. The user can then take action, if necessary, based on the information conveyed by the notification. In some cases, the automated attendee system may allow the user to provide a response over the communication session without having to join personally. Thus, despite not attending the meeting personally, the user is still able to receive relevant information about what is being discussed/presented during the meeting.

Figure 1:
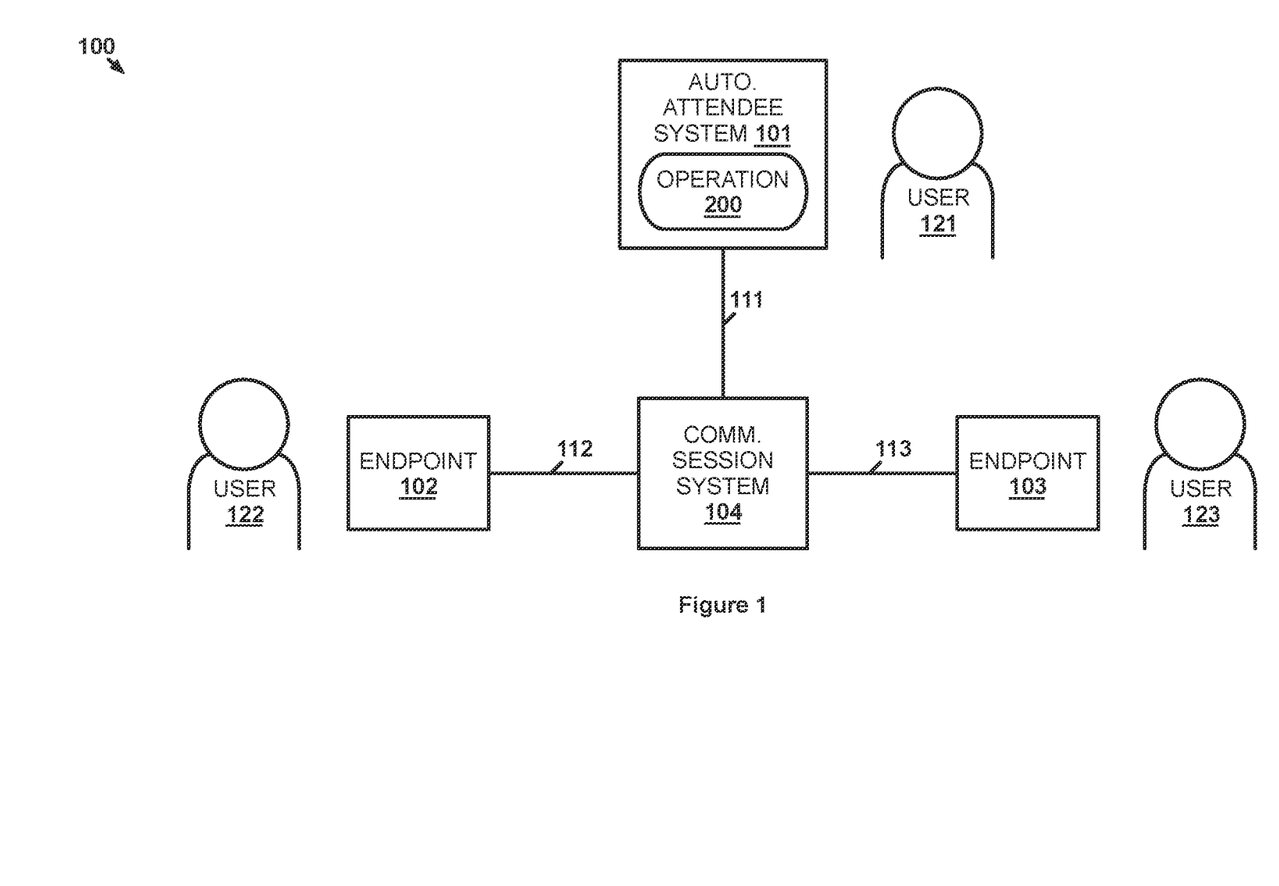
FIG. 1 illustrates an implementation for participating in a communication session on behalf of an absent participant.

FIG. 1 illustrates implementation 100 for participating in a communication session on behalf of an absent participant. Implementation 100 includes automated attendee system 101, endpoint 102, endpoint 103, and communication session system 104. User 122 operates endpoint 102 and user 123 operates endpoint 103. User 121 is shown as operating automated attendee system 101. User 121 may operate automated attendee system 101 directly if automated attendee system 101 is a user system, like endpoints 102 and 103 are, or user 121 may control automated attendee system 101 through a user system in communication with automated attendee system 101. Alternatively, automated attendee system 101 may operate on user 121's behalf without explicit direction from user 121. Automated attendee system 101 and communication session system 104 communicate over communication link 111. Endpoint 102 and communication session system 104 communicate over communication link 112. Endpoint 103 and communication session system 104 communicate over communication link 113. Communication links 111-113 are shown as direct links but may include intervening systems, networks, and/or devices.

In operation, endpoint 102 and endpoint 103 may each respectively be a telephone, tablet computer, laptop computer, desktop computer, conference room system, or some other type of computing device capable of connecting to a communication session facilitated by communication session system 104. Communication session system 104 facilitates communication sessions between two or more endpoints, such as endpoint 102 and endpoint 103. In some examples, communication session system 104 may be omitted in favor of a peer-to-peer communication session between endpoint 102 and endpoint 103. A communication session may be audio only (e.g., a voice call) or may also include a video component (e.g., a video call), a graphic component (e.g., presentation slides, screen sharing, etc.), text chat component, and/or some other type of real-time communication. During a communication session, user 122 and user 123 are able to speak with, or to, one another by way of their respective endpoints 102 and 103 capturing their voices and transferring the voices over the communication session. Other examples may include more than two participants and/or more than two endpoints on the communication session.

Automated attendee system 101 is also connected to communication session system 104 so that automated attendee system 101 can receive the user communications exchanged between endpoint 102 and endpoint 103. While not necessarily a user system like endpoints 102 and 103 (e.g., automated attendee system 101 may be a remote server or other type of computing system), automated attendee system 101 may be capable of joining the communication session between endpoint 102 and endpoint 103 as another endpoint to that communication session. In other examples, communication session system 104 may obtain the user communications using Application Programming Interfaces (APIs) provided by communication session system 104, by installing a plugin, or other type of software, into communication session system 104 that directs the user communications to automated attendee system 101, the features of automated attendee system 101 may be incorporated into communication session system 104 rather than being a separate system, as shown, or automated attendee system 101 may obtain the user communications in some other manner.

Figure 2:
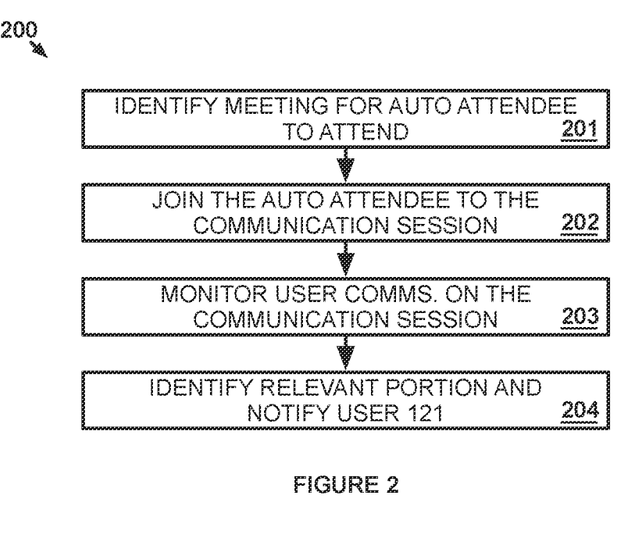
FIG. 2 illustrates an operation to participate in a communication session on behalf of an absent participant.

FIG. 2 illustrates operation 200 to participate in a communication session on behalf of an absent participant. During operation 200, automated attendee system 101 identifies a meeting for an automated attendee to attend on behalf of user 121 (201). The automated attendee is an entity (sometimes referred to as a bot) that automated attendee system 101 will represent itself as on a communication session for the identified meeting. Identifying the meeting at least identifies a meeting time for the meeting (i.e., when the meeting will occur) and information identifying a communication session for the meeting. The identifying information may include a link (e.g., uniform resource locator) to join the communication session, security information (e.g., passcode needed to join), a phone number for the communication session, or some other information relevant to automated attendee system 101's ability to join the communication session. User 121 may explicitly inform automated attendee system 101 about the meeting (e.g., via input directly into automated attendee system 101 or through another user system operated by user 121) or automated attendee system 101 may identify the meeting using information about user 121's schedule. For example, the meeting may be identified from an entry of an electronic calendar of user 121 (e.g., stored in a calendar system or on a user system of user 121) as being in conflict with another event having an entry in the calendar. The entries for the meeting and the other event may indicate a priority relative to each other. In this case, the other event has higher priority for user 121, so automated attendee system 101 determines automatically that the meeting needs to be attended by its automated attendee. In another example, user 121 may include an indicator in a calendar entry for the meeting that indicates to automated attendee system 101 that the automated attendee should attend the meeting or may indicate the preference elsewhere for automated attendee system 101 to join the meeting.

At the time for the meeting, automated attendee system 101 joins the automated attendee to the communication session for the meeting (202). As noted above, automated attendee system 101 may join the communication session as an endpoint or may communicate with communication session system 104 to include the automated attendee on the communication session in another manner that enables automated attendee system 101 to receive user communications exchanged by user 122 and user 123 over the communication session. When joining as an endpoint, automated attendee system 101 may provide credentials of user 121 to indicate that automated attendee system 101 is joining on behalf of user 121, may execute a client application for communicating with communication session system 104, or may perform some other action necessary for an endpoint to join a particular communication session facilitated by communication session system 104. In other examples, communication session system 104 may provide APIs that may be employed by automated attendee system 101 to join communication sessions as an automated attendee. Other manners of joining the communication session to obtain the user communications may also be used. While automated attendee system 101 is on the communication session, automated attendee system 101 may identify itself on the communication session as being user 121, as being an automated attendee generally, as being an automated attendee on behalf of user 121, or may be identified to user 122 and user 123 in some other manner. For example, a participant list displayed at endpoint 102 may show a name of user 123 and a name of user 121 with an indication that the automated attendee is joining on their behalf (e.g., an icon or other visual indicator may be listed next to user 121's name in the participants list).

After joining the communication session, automated attendee system 101 monitors, in real-time, the user communications exchanged between endpoint 102 and endpoint 103 over the communication session (203). The user communications may include audio, video, presentation visuals, screen sharing visuals, text based messages, or some other type of real-time communications. The type of user communications monitored may depend on the capabilities of communication session system 104, settings for the communication session (e.g., whether video, slide presentation, or screen sharing is enabled), a connection of automated attendee system 101 to the communication session (e.g., using a client application or call through telephone network), and/or some other factor related to the communication session or endpoints connected thereto. Automated attendee system 101 monitors the user communications for a portion of the user communications that is relevant to user 121. User 121 may explicitly define in automated attendee system 101 what user 121 considers relevant user communications and/or automated attendee system 101 may automatically determine what it considers to be relevant to user 121. For example, user 121 may explicitly provide input defining one or more topics that are of interest and, therefore, relevant to user 121. Alternatively, automated attendee system 101 may analyze other information about user 121 and/or the meeting to automatically determine what may be relevant to user 121. For instance, user 121 may access a user profile for user 121, which indicates what topics may be of interest to user 121 (e.g., timetables for a particular product release). In a specific example, user 121 may be an employee of a company that maintains a database of user profiles for its employees and each user profile includes information about the employee's duties. User 121's profile may, therefore, indicate that user 121 is a project manager on a particular aspect of a product. Automated attendee system 101 may then determine that user communications discussing that aspect of the product are relevant to user 121.

In some examples, automated attendee system 101 may monitor for keywords/phrases in the user communications that correspond to a topic relevant to user 121. For instance, the product from the above example may have a name and automated attendee system 101 may determine that user communications before and/or after mention of that name are a relevant portion to user 121. Similarly, in some examples, automated attendee system 101 may recognize when user 121's name is mentioned in the user communications and determine that the user communications before and/or after the mention of user 121's name are relevant thereto. In some examples, automated attendee system 101 may employ Artificial Intelligence (AI) algorithms, such as Natural Language Recognition, Natural Language Processing (NLP), Machine Learning, Deep Learning, Speech Synthesis, Speech-to-text, or any combination thereof, to determine topics being discussed in the user communications for comparison to topics of interest to user 121, which may similarly be determined using AI algorithms. If an identified topic corresponds to a topic of interest to user 121, then automated attendee system 101 may determine that the portion of the user communications having the identified topic are relevant to user 121. In further examples, user 122 and/or user 123 may be able to manually indicate that a portion of the user communications are relevant to user 121. For instance, a button may be presented by a client application executing on endpoint 102 that, when pressed, indicates to automated attendee system 101 that the discussion is relevant to user 121. Alternatively, there may be certain phrases that automated attendee system 101 will monitor for that a user can say to trigger a manual relevancy indication. For example, endpoint 102 may speak "this is relevant to user 121" to trigger automated attendee system 101 to identify the portion of the user communications as being relevant to user 121. In some examples, only a moderator of the communication session may have the ability to manually indicate that a portion is relevant to user 121. Other manners of determining which portions of the user communications are relevant to user 121 may also be used—including combinations thereof.

During the monitoring, upon identifying a portion of the user communications that is relevant to user 121, automated attendee system 101 notifies user 121 about the portion (204). If automated attendee system 101 is a user system operated by user 121, then user 121 may be notified by automated attendee system 101 displaying an alert, producing an audible sound, producing a vibration, and/or performing some other action that will alert user 121 to the notification. If automated attendee system 101 is not a user system operated by user 121, then automated attendee system 101 may direct the user system to notify user 121 in a manner described above. In some cases, the notification may be presented to user 121 by a client application interface to automated attendee system 101 executing on user 121's user system. In other examples, the notification may be provided over a standardized messaging format. For instance, automated attendee system 101 may send a text message, a email, a chat message, or some other type of message to user 121's user system and the user system generates an alert for user 121 in response to receiving the message.

The notification from automated attendee system 101 may generically indicate that a portion relevant to user 121 has been detected in the user communications or may provide additional information about the portion's relevance. The additional information may include a text transcript of the portion, a recording of the portion, a summarization or notes of the portion, or some other information explicitly indicating what is being discussed during the portion. By providing additional information, user 121 is notified more precisely about why automated attendee system 101 considers the portion relevant. For instance, if there are multiple topics that user 121 defined as being relevant, the additional information may indicate which topic is the subject of the portion, whereas a generic notification without the additional information may simply indicate that a topic was identified without indicating which one. Moreover, the additional information may provide details about the content of the discussion in the portion (e.g., using a transcript of the portion or notes about the portion) such that user 121 knows what is being discussed without having to join the communication session or review the communication after the fact (e.g., listen to a recording of the session).

It should be understood that, while the above example only identifies one portion of interest, additional portions of interest to user 121 may also be identified with each triggering its own respective notification from automated attendee system 101. Also, while automated attendee system 101 is only described as joining an automated attendee to one communication session, automated attendee system 101 may join other automated attendees to other communication sessions contemporaneously. For example, automated attendee system 101 may provide the automated attendee services described herein to more users than user 121 or provide the automated attendee services to multiple meetings of user 121 at the same time.

In some examples, automated attendee system 101 enables user 121 to provide input into the communication session without having to join the communication session themselves. Automated attendee system 101 may receive input (e.g., a text based message or audio message) from user 121 for inclusion in the user communications. The input may be received before the notification is ever sent (e.g., predefined by user 121 prior to the meeting start time) or user 121 may provide the input in response to the notification. In one example, user 121 may anticipate that their input will be required or beneficial to a particular topic and provide the input at the same time that the user indicates to automated attendee system 101 that the topic is one of interest to user 121. When automated attendee system 101 identifies the topic, automated attendee system 101 may automatically insert the input into the user communications where appropriate. In some examples, automated attendee system 101 may use a "hand raise" function of communication session system 104 to indicate that the automated attendee is prepared to contribute. In those examples, automated attendee system 101 waits for the moderator to unmute the automated attendee before inserting the input into the user communications. As mentioned above, the input may be a text-based message. In those examples, the message may be posted to a text chat thread of the communication session or automated attendee system 101 may synthesize a voice using text-to-speech in order to speak in the audio of the user communications. Moreover, the text-to-speech may use deep learning to emulate user 121's voice and give user 122 and user 123 the impression that user 121 is actually speaking.

In examples where user 121 provides the input in response to the notification from automated attendee system 101 that a portion of the user communications is relevant to user 121, user 121 may provide the input into whichever communication mode was used for the notification. For example, if a client application executing on user 121's user system for accessing automated attendee system 101 provided the notification, then that client application may also provide user 121 with a mechanism to provide input in response to the notification. In another example, if the notification is received over text message or email, then user 121 may provide their input in a text message or email reply back to automated attendee system 101. In some examples, since the notification is provided in real-time as automated attendee system 101 identifies the relevant portion of the user communications, automated attendee system 101 may insert user 121's response in real-time as well. In some examples, the input from user 121 may be inserted into the user communications as user 121 is providing the input (i.e., automated attendee system 101 does not wait for the input to be fully entered before automated attendee system 101 begins to insert the input into the user communications).

In further examples, when the communication session has ended, automated attendee system 101 may provide user 121 with a summary or notes (e.g., bullet points about topics discussed, snapshots of displayed user communications, e.g., slides, graphs, charts, etc., or some other subset of the user communications) of the user communications. The summary/notes may only cover portions of interest to user 121 that were identified by automated attendee system 101 or may cover the entirety of the user communications. In the latter case, automated attendee system 101 may highlight, or otherwise indicate, the portions of interest. Similarly, in some examples, automated attendee system 101 may provide user 121 with transcripts and/or recordings of the relevant portions determined during the meeting.

While the automated attendee attends the entirety of the meeting on behalf of user 121 in the above examples, the automated attendee may attend for less than all of the meeting in other examples. For instance, user 121 be able to attend the meeting starting 15 minutes after the meeting starts. The automated attendee may, therefore, attend the first 15 minutes of the meeting until user 121 joins the communication session. Upon detecting that user 121 has joined, automated attendee system 101 drops from the communication session.

Figure 3:
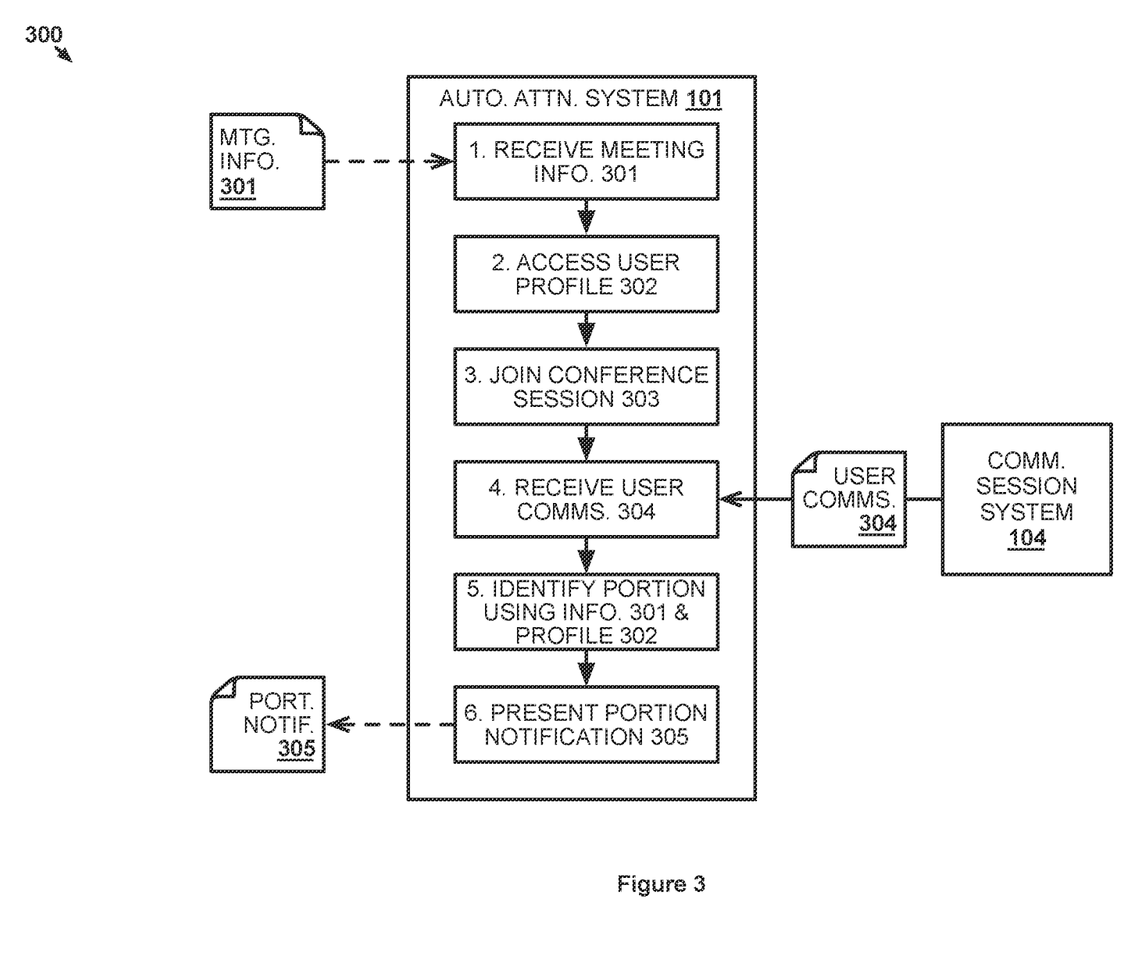
FIG. 3 illustrates an operational scenario for participating in a communication session on behalf of an absent participant.

FIG. 3 illustrates an operational scenario 300 for participating in a communication session on behalf of an absent participant. Operational scenario 300 is an example of how automated attendee system 101 may monitor user communications. In operational scenario 300, automated attendee system 101 receives meeting information 301 at step 1. Meeting information 301 includes at least a start time for the meeting and information for conference session 303 over which the meeting will be conducted (e.g., a Uniform Resource Locator (URL) that directs to communication session system 104 for joining conference session 303). Meeting information 301 may be received directly from user 121 (e.g., through explicit user input via a user interface of automated attendee system 101 or a user interface of a user system in communication with automated attendee system 101) or indirectly from another source, such as an electronic calendar or to-do list of user 121. In an example of an indirect way in which automated attendee system 101 may receive meeting information 301, automated attendee system 101 may identify meeting information 301 from an entry in a calendar of user 121. The entry may include an explicit indicator directing automated attendee system 101 to join with an automated attendee on user 121's behalf or automated attendee system 101 may determine automatically that the automated attendee should join based on context (e.g., the meeting is at a time that conflicts with a higher priority meeting for user 121). In this example, meeting information 301 also includes information indicating what user 121 considers relevant. For example, meeting information 301 may include a meeting agenda that lists topics and users associated with each topic. Automated attendee system 101 may recognize the topics associated with user 121 and monitor user communications 304 for those topics accordingly.

Prior to joining the meeting identified from meeting information 301, automated attendee system 101 accesses user profile 302 at step 2 to obtain information about user 121 that may also be useful when identifying portions of user communications 304 that are relevant to user 121. User profile 302 may be stored locally on automated attendee system 101 or automated attendee system 101 may access user profile 302 from some other system. User profile 302 may include information indicating user 121's job title, business group, project team, current project, work profile, expertise/skillset, or any other type of information that would indicate what topics user 121 considers relevant.

When the meeting time defined in meeting information 301 is reached, automated attendee system 101 joins conference session 303 at step 4, either as an endpoint thereto or through other means, and begins receiving user communications 304 thereafter at step 4. User communications 304 include audio and/or video captured by endpoint 102 and/or endpoint 103 for transmission in real-time over user communications 304 through communication session system 104. User communications 304 may also include other information, such as presentation slides, desktop sharing, or a chat channel, to be shared between connected endpoints.

In real-time as automated attendee system 101 is receiving real-time user communications 304, automated attendee system 101 analyzes user communications 304 at step 5 based on the information gleaned from meeting information 301 and user profile 302 to identify portions of user communications 304 that are relevant to user 121. For example, if user 122 and user 123 begin discussing a topic that automated attendee system 101 determined to be relevant to user 121, the automated attendee system 101 determines that the portion of user communications 304 in which the topic is being discussed is relevant to user 121. In response to identifying the relevant portion, automated attendee system 101 presents portion notification 305 at step 6 to user 121. User 121 is, therefore, notified that a relevant topic is being discussed in user communications 304 in real-time as automated attendee system 101 is able to identify that portion in real-time. If automated attendee system 101 is user 121's user system, the automated attendee system 101 may present portion notification 305 by displaying an alert message, playing an alert sound, or producing some other type of alert. Alternatively, if automated attendee system 101 is not a user system of user 121, automated attendee system 101 may direct a user system of user 121 to produce an alert.

Figure 4:
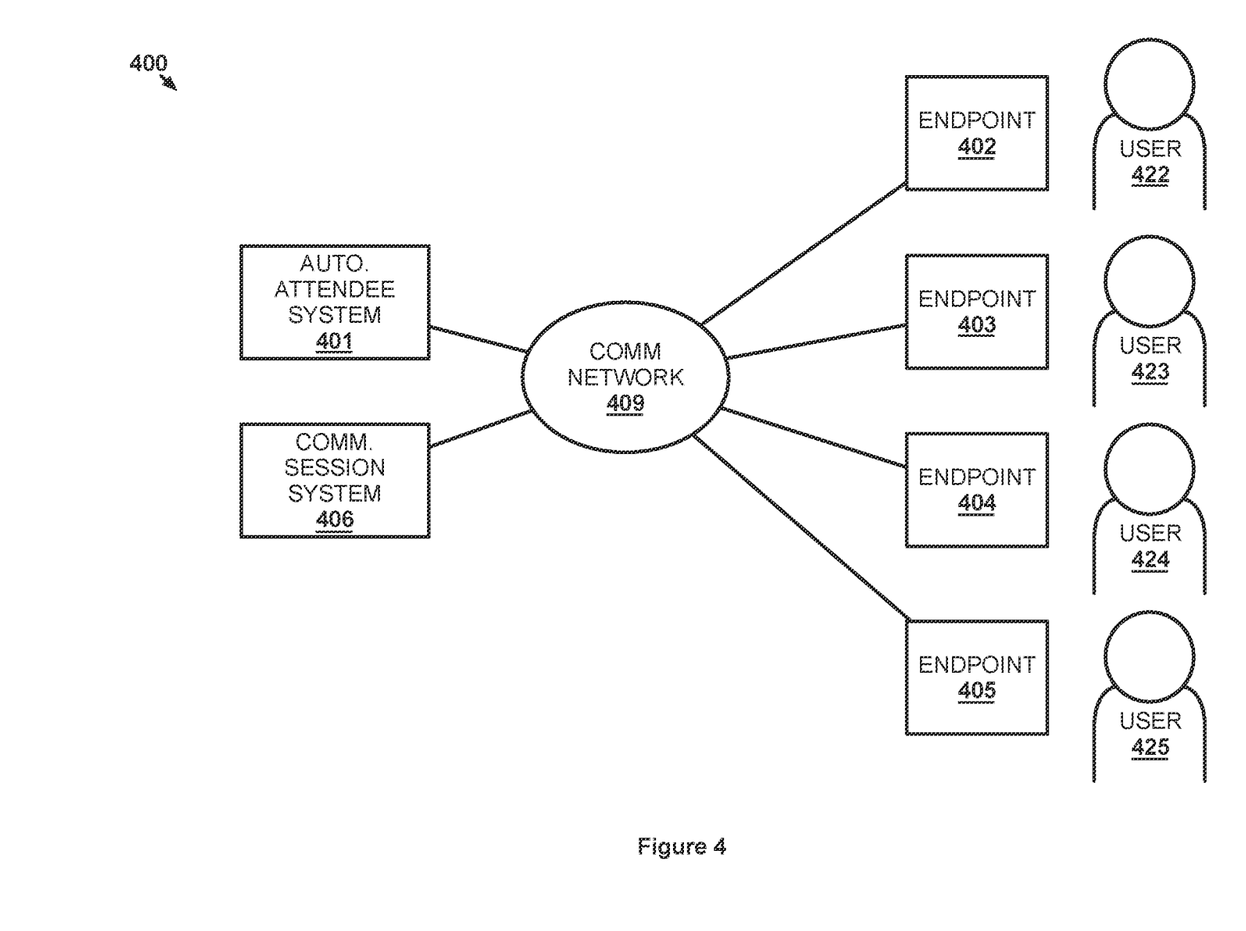
FIG. 4 illustrates an implementation for participating in a communication session on behalf of an absent participant.

FIG. 4 illustrates implementation 400 for participating in a communication session on behalf of an absent participant. Implementation 400 includes automated attendee system 401, endpoints 402-405, communication session system 406, and communication network 409. Communication network 409 includes one or more local area networks and/or wide area computing networks, including the Internet, over which systems 401-408 communicate. Endpoints 402-405 may each comprise a telephone, laptop computer, desktop workstation, tablet computer, conference room system, or some other type of user operable computing device. Endpoints 402-405 are operated by users 422-425, respectively. Communication session system 406 may be an audio/video conferencing server, a packet telecommunications server, a web-based presentation server, or some other type of computing system that facilitates user communication sessions between endpoints. Endpoints 402-405 may each execute a client application that enables endpoints 402-405 to join communication sessions facilitated by communication session system 406. Automated attendee system 101 may also execute a similar client application to join the communication sessions as an endpoint even though, at least in this example, automated attendee system 101 is a server and not a user system like endpoints 402-405.

Figure 5:
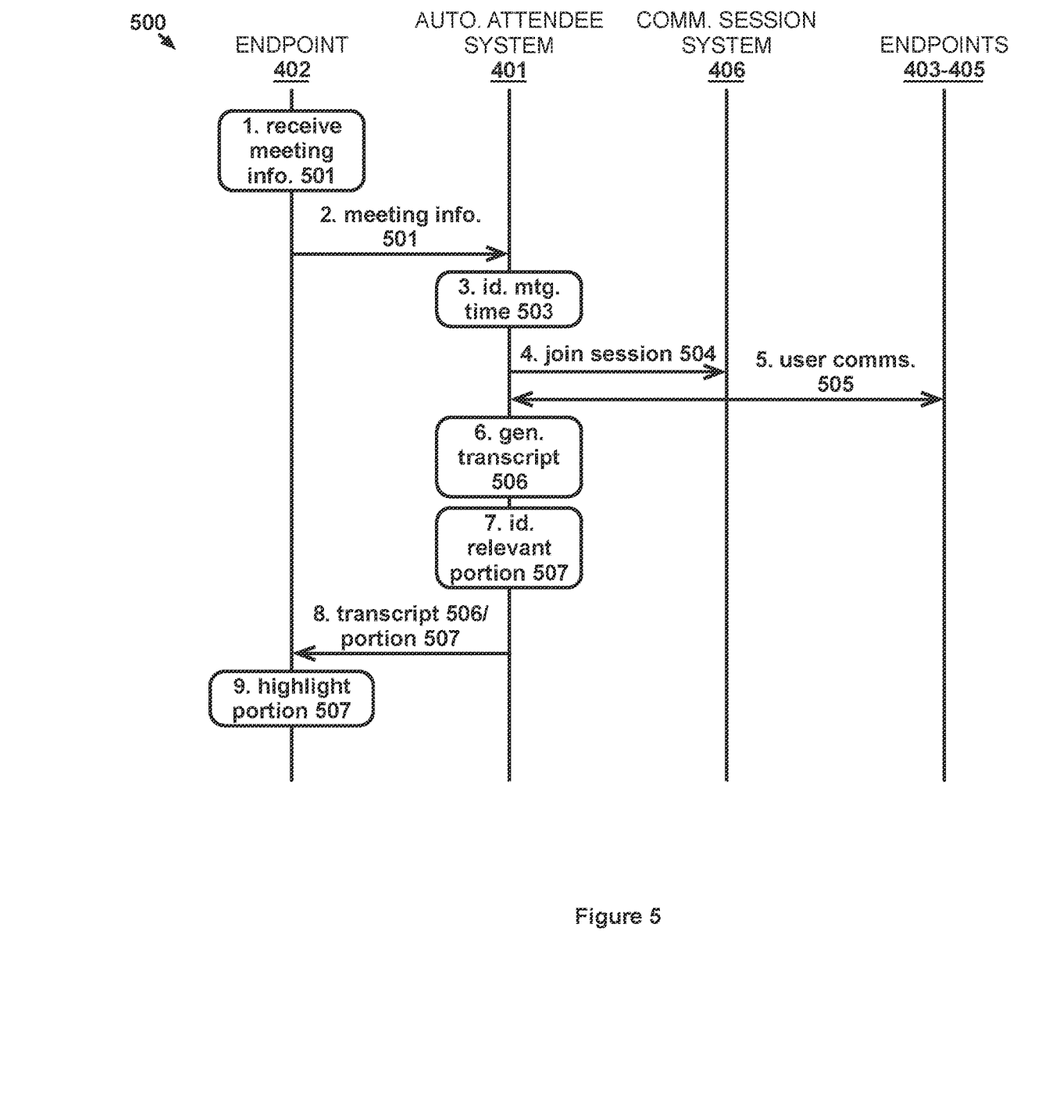
FIG. 5 illustrates an operational scenario for participating in a communication session on behalf of an absent participant.

FIG. 5 illustrates operational scenario 500 for participating in a communication session on behalf of an absent participant. In operational scenario 500, endpoint 402 receives meeting information 501 at step 1 from user 422. Meeting information 501 includes information identifying a meeting, and communication session 504 for that meeting, that user 422 is instructing automated attendee system 401 to attend on their behalf with an automated attendee. In this example, user 422 also identifies, within meeting information 501, topics of interest for automated attendee system 401 to monitor during the meeting. Meeting information 501 is transmitted to automated attendee system 401 at step 2. Meeting information 501 may be received via a client application executing on endpoint 402 (e.g., natively executing or executing within a browser as a web app), which also transmits meeting information 501, or meeting information 501 may be received an transmitted using some other mechanism (e.g., emailing meeting information 501 to automated attendee system 401).

Automated attendee system 401 identifies meeting time 503 at step 3 from within meeting information 501 so that automated attendee system 401 can join the automated attendee to communication session 504 at the proper meeting time. When meeting time 503 arrives, automated attendee system 401 communicates with communication session system 406 at step 4 to join communication session 504 as an automated attendee. Once joined, automated attendee system 401 receives user communications 505 exchanged over communication session between endpoints 403-405, which are also joined thereto.

In this example, automated attendee system 401 performs speech-to-text processing of user communications 505 to generate transcript 506 of user communications 505 in real time at step 6. Transcript 506 may be generated using any speech-to-text processing algorithm. Transcript 506 may simply include the words being spoken or may include additional language processing to include punctuation, an indication of who is speaking the words (e.g., as determined based on the endpoint from which the speech is received), or any other feature that would be beneficial to a reader of the transcript. In some examples, transcript 506 may be streamed continually (e.g., for presentation by a client application), or transferred in segments (e.g., chunks of an allowable message size, if being sent over a messaging protocol), to endpoint 402. User 422 can then view the progress of the meeting by looking at transcript 506 if user 422 has time to check. As automated attendee system 401 performs speech-to-text to generate transcript 506, automated attendee system 401 performs natural language processing on transcript 506 to determine whether anything relevant to user 422 is being discussed. In particular, the natural language processing determines what topic is currently being discussed and automated attendee system 401 determines whether that current topic matches a relevant topic indicated by user 422 in meeting information 501 or a relevant topic determined from some other source (e.g., a user profile). In other examples, automated attendee system 401 may further, or instead, determine whether something relevant is being discussed by monitoring transcript 506 for keywords/phrases that are indicative of something being relevant to user 422. For example, automated attendee system 401 may monitor transcript 506 for user 422's name to be spoken (e.g., a question or information request is made of user 422 in transcript 506), a name of a project associated with user 422, or a phrase typically used when discussing a topic (e.g., if the relevant topic is financial trends, then automated attendee system 401 may monitor for phrases with the term "revenue").

Automated attendee system 401 identifies relevant portion 507 in real-time at step 7 using one or more of the methods discussed above. Upon identifying relevant portion 507, automated attendee system 401 transmits relevant portion 507, and transcript 506 (if not already being transmitted) are transmitted to endpoint 402 at step 8. Since relevant portion 507 is a portion of transcript 506, relevant portion 507 may be indicated within transcript 506 rather than being a separate transmittal. For example, transcript 506 may be a rich text-type format and automated attendee system 401 may change the font for relevant portion 507 relative to non-relevant portions of transcript 506 or automated attendee system 401 may insert predefined character strings to indicate where relevant portion 507 begins and ends (if an end time has even been determined yet given that the identification of relevant portion 507 occurs in real time). In some examples, transcript 506 and relevant portion 507 are transmitted to a client application executing on endpoint 402, while transcript 506 and relevant portion 507 may be transferred in another messaging format, such as email, in other examples.

Upon receiving transcript 506 and relevant portion 507, endpoint 402 notifies user 422 about relevant portion 507 by displaying transcript 506 and highlighting relevant portion 507 within transcript 506 at step 9. In some examples, the font of relevant portion 507 may be changed in transcript 506 to a font option that highlights relevant portion 507 so endpoint 402 simply displays transcript 506 as received. The font option may, for example, be an underlining, bolding, italicizing, etc. of relevant portion 507. Alternatively, to highlight relevant portion 507, the background to the text of relevant portion 507 may be changed (e.g., to mimic a highlighter being used on paper), relevant portion 507 may be circled, or relevant portion 507 may be otherwise visually highlighted in transcript 506 when endpoint 402 is displaying relevant portion 507. In other examples, endpoint 402 may receive the indication of relevant portion 507, locate relevant portion 507 in transcript 506, and highlight relevant portion 507 in transcript 506. If endpoint 402 is not receiving and presented transcript 506 in its entirety, endpoint 402 may determine an amount of transcript 506 surrounding relevant portion 507 to also display along with the highlighted relevant portion 507. Presenting more than just relevant portion 507 may allow user 422 to glean additional context regarding relevant portion 507. In some examples where transcript 506 is being streamed to endpoint 402 in real time, automated attendee system 401 may identify relevant portion 507 after part of relevant portion 507 is already being displayed. Endpoint 402 may, therefore, highlight the part already being displayed (or redisplay the part) as well as the remainder of relevant portion 507 as it's received from automated attendee system 401.

Figure 6:
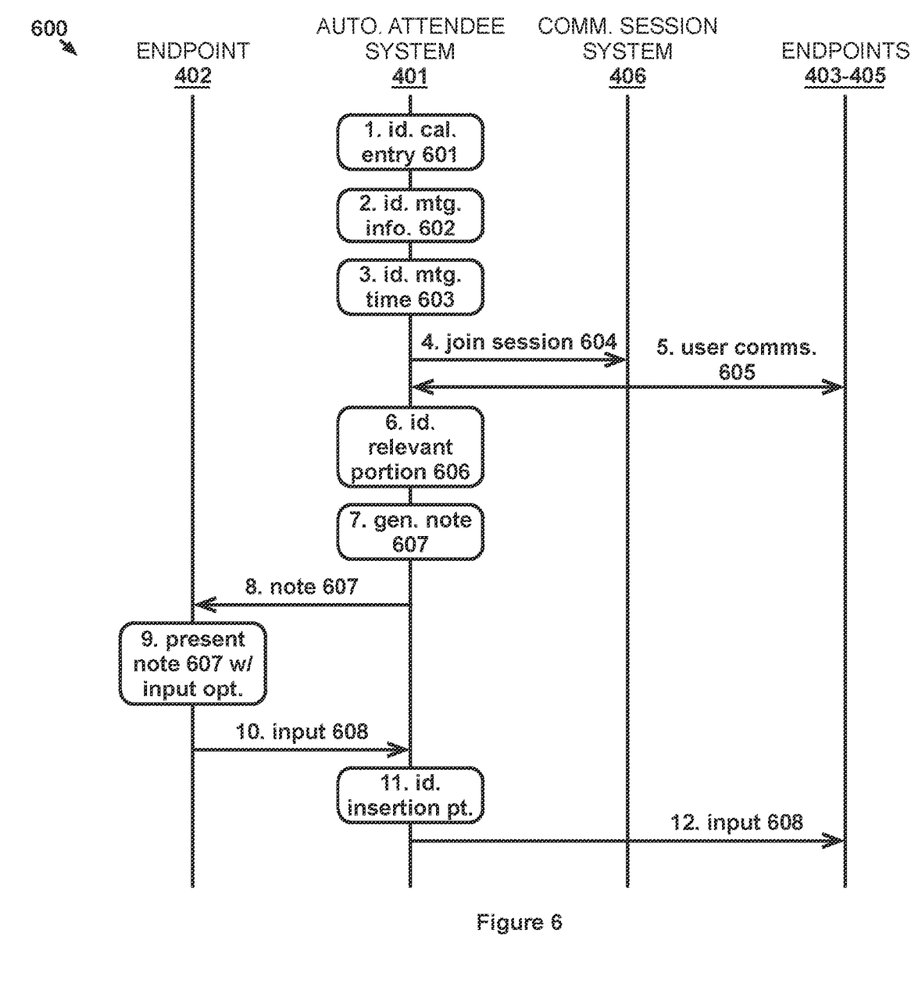
FIG. 6 illustrates another operational scenario for participating in a communication session on behalf of an absent participant.

FIG. 6 illustrates operational scenario 600 for participating in a communication session on behalf of an absent participant. In this example, automated attendee system 401 identifies calendar entry 601 at step 1 from an electronic calendar of user 422. Automated attendee system 401 may access the electronic calendar from endpoint 402, from a calendar server, or from some other source. User 422 may explicitly indicate in calendar entry 601 that the meeting defined by calendar entry 601 is one that automated attendee system 401 should attend with an automated attendee or automated attendee system 401 may infer that the meeting should be attended by the automated attendee (e.g., may conflict with a higher priority entry). Automated attendee system 401 further identifies meeting information 602 at step 2 from within calendar entry 601. Meeting information 602 includes information identifying a meeting, and communication session 604 for that meeting, that automated attendee system 401 is to attend on user 422's behalf with an automated attendee. In this example, user 422 also identifies, within meeting information 602, topics of interest for automated attendee system 401 to monitor during the meeting. For instance, user 422 may have entered topics of interest in the notes section of calendar entry 601.

Automated attendee system 401 identifies meeting time 603 at step 3 from within meeting information 602 so that automated attendee system 401 can join the automated attendee to communication session 604 at the proper meeting time. When meeting time 603 arrives, automated attendee system 401 communicates with communication session system 406 at step 4 to join communication session 604 as an automated attendee. Once joined, automated attendee system 401 receives user communications 605 exchanged over communication session between endpoints 403-405, which are also joined thereto.

Like automated attendee system 401 identified relevant portion 507 above, automated attendee system 401 identifies relevant portion 606 in real time at step 6 in this example. Although not shown, automated attendee system 401 may generate a transcript similar to transcript 506 from which relevant portion 606 is identified. Other examples may skip the transcript generation step. Rather than explicitly providing a transcript of relevant portion 606 for presentation to endpoint 402, automated attendee system 401 generates note 607 at step 7. Natural language processing may be used to extract key aspects or phrases of relevant portion 606 to reduce relevant portion 606 to something, such as a summary or outline, that can be more quickly consumed by user 422.

Note 607 is transmitted to endpoint 402 at step 8 and endpoint 402 presents note 607 to user 422 at step 9 to notify user 422 about relevant portion 606. Endpoint 402 may display note 607 or may synthesize a voice to read note 607. When presenting note 607, endpoint 402 provides user 422 with an option to provide input 608 on communication session 604 (e.g., respond to what is being said or otherwise provide input 608 to the discussion). If note 607 is presented by a client application executing on endpoint 402, then the client application may provide a user interface element(s) (e.g., button, text entry field, etc.) along with note 607 with which user 422 can interact to provide input 608. For instance, user 422 may provide input 608 by type a message into a text entry field or may record an audio message. Alternatively, if note 607 is transferred via a traditional communication protocol, then user 422 may respond in an application for that protocol. For example, endpoint 402 may receive note 607 in an email to user 422 and user 422 may direct endpoint 402 to reply to that email. User 422's input 608 may, therefore, be typed into the reply. In further examples, user 422 may record their own voice as input to be played, or converted to text, in user communications 605. A client application executing on endpoint 402 may provide user 422 with the ability to record or user 422 may provide the recording over an alternative messaging mechanism (e.g., attach a voice recording to an email reply).

Input 608 is transmitted to automated attendee system 401 at step 10. Upon receiving input 608, automated attendee system 401 identifies a point in which input 608 should be inserted into user communications 605 at step 11. In some examples, automated attendee system 401 may automatically identify the insertion point (e.g., may wait for a pause in the conversation between users 423-425). In other examples, a moderator, or other user, may be notified by automated attendee system 401 that input is ready to be provided (e.g., automated attendee system 401 may trigger a hand raise feature corresponding to the automated attendee) and the moderator may then give automated attendee system 401 to insert input 608 into user communications 605. In some cases, a conferencing client may provide an explicit way in which the moderator can signal for automated attendee system 401 to provide the input (e.g., via a dedicated button or by taking the automated attendee off of mute) or automated attendee system 401 may monitor for instructions within user communications 605 (e.g., the moderator may speak "Let's hear from user 422 now").

Regardless of how the insertion point is determined, automated attendee system 401 inserts input 608 into user communications 605 at step 12. If input 608 is in a text format, automated attendee system 401 may synthesize a voice to read input 608 on the voice channel of communication session 604 and/or automated attendee system 401 may insert the text of input 608 into a text channel of communication session 604. Alternatively, input 608 may be provided as a recording that automated attendee system 401 may play on a voice channel of communication session 604.

Figure 7:
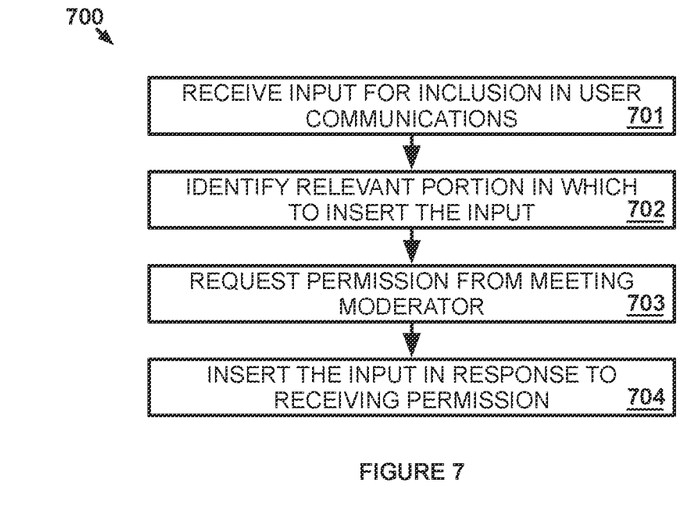
FIG. 7 illustrates an operation to participate in a communication session on behalf of an absent participant.

FIG. 7 illustrates operation 700 to participate in a communication session on behalf of an absent participant. Operation 700 is an example of how a moderator may identify the insertion point for input received from user 422. In operation 700, automated attendee system 401 receives input for inclusion in user communications (701). The input may be received during the communication session carrying the user communications, as occurred in operational scenario 600, or may be received prior to the communication session. Automated attendee system 401 then identifies a relevant portion of the user communications into which the input should be inserted (e.g., determines that the topic of the input matches the topic of the relevant portion) (702). Though not shown, automated attendee system 401 further notifies user 422 that the relevant portion has been identified. Automated attendee system 401 requests permission from the communication session's moderator to insert the input into the user communications (703). Automated attendee system 401 may use a hand raise feature of communication session system 406, may sent a chat message to the moderator, or may notify the moderator that automated attendee system 401 is ready to provide input in some other manner. In response to the moderator giving automated attendee system 401 permission, automated attendee system 401 inserts the input into the user communications (704).

Figure 8:
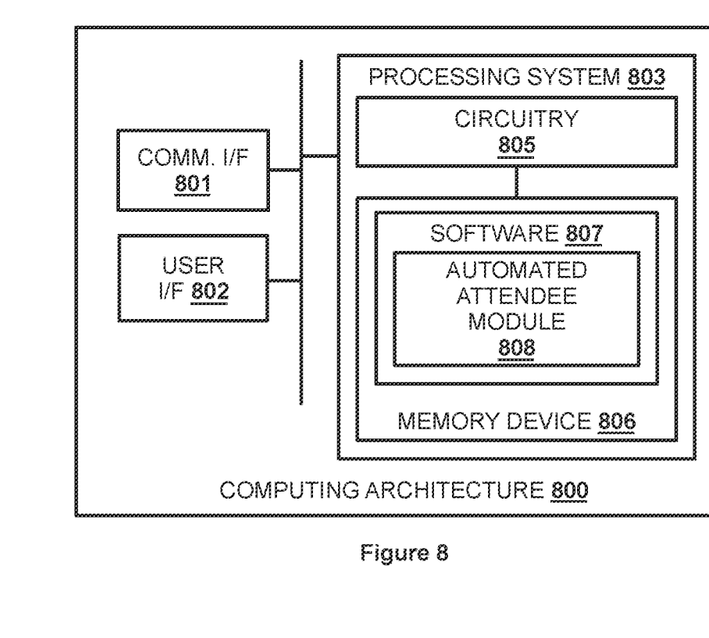
FIG. 8 illustrates a computing architecture for participating in a communication session on behalf of an absent participant.

FIG. 8 illustrates computing architecture 800 for participating in a communication session on behalf of an absent participant. Computing architecture 800 is an example computing architecture for automated attendee systems 101 and 401, although systems 101 and 401 may use alternative configurations. Other systems described above, such as the endpoints and communication session systems, may also use computing architecture 800. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes automated attendee module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, automated attendee module 808 directs processing system 803 to identify a meeting for an automated attendee to attend on behalf of a user. At a time for the meeting, automated attendee module 808 directs processing system 803 to join the automated attendee to a communication session for the meeting. Automated attendee module 808 also directs processing system 803 to monitor, in real-time, user communications exchanged between two or more other users over the communication session. During the monitoring, upon identifying a portion of the user communications that is relevant to the user, automated attendee module 808 directs processing system 803 to notify the user about the portion.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   identifying a meeting for an automated attendee to attend on behalf of a user;
   at a time for the meeting, joining the automated attendee to a communication session for the meeting;
   in the automated attendee:
      monitoring, in real-time, user communications exchanged between two or more other users over the communication session;
      generating a transcript of the user communications;
      providing the transcript to the user; and
      during the monitoring, upon identifying a portion of the user communications that is relevant to the user, notifying the user about the portion, wherein notifying the user includes highlighting the portion to the user in real-time within the transcript.

2. The method of claim 1, comprising:
   prior to the time, receiving input from the user describing information that the user considers relevant; and
   identifying the portion based on the information.

3. The method of claim 2, comprising:
   accessing a user profile for the user; and
   identifying the portion based on the user profile.

4. The method of claim 1, comprising:
   after identifying the portion, inserting predefined input into the user communications, wherein the predefined input comprises text or a voice recording.

5. The method of claim 4, wherein the predefined input comprises text and inserting the predefined input comprises:

inserting the text into a chat channel of the communication session.

6. The method of claim 4, wherein the predefined input comprises text and inserting the predefined input comprises:
synthesizing speech from the text; and
playing the speech over the communication session.

7. The method of claim 1, wherein notifying the user includes producing a sound and/or vibration for the user.

8. The method of claim 7, wherein notifying the user includes providing a recording of the portion to the user.

9. The method of claim 1, comprising:
after notifying the user, receiving input from the user for inclusion in the user communications, wherein the input comprises text or a voice recording; and
including the input in the user communications in real time with the receipt of the input.

10. The method of claim 9, wherein the input comprises text and including the input comprises:
synthesizing speech from the text; and
playing the speech over the communication session.

11. The method of claim 9, wherein including the input comprises:
after notifying the user, receiving input from the user for inclusion in the user communications, wherein the input comprises text or a voice recording;
notifying a meeting moderator about the input; and
inserting the input into the user communications upon receiving an indication from the meeting moderator allowing insertion of the input.

12. The method of claim 1, comprising:
identifying the portion based on the user communications including a name of the user.

13. An apparatus comprising:
one or more computer readable storage media;
a processing system operatively coupled with the one or more computer readable storage media; and
program instructions stored on the one or more computer readable storage media that, when read and executed by the processing system, direct the apparatus to:
identify a meeting for an automated attendee to attend on behalf of a user;
at a time for the meeting, join the automated attendee to a communication session for the meeting;
monitor, in real-time, user communications exchanged between two or more other users over the communication session;
generate a transcript of the user communications;
provide the transcript to the user; and
during the monitoring, upon identifying a portion of the user communications that is relevant to the user, notify the user about the portion, including highlighting the portion to the user in real-time within the transcript.

14. The apparatus of claim 13, wherein the program instructions direct the processing system to:
prior to the time, receive input from the user describing information that the user considers relevant; and
identify the portion based on the information.

15. The apparatus of claim 14, wherein the program instructions direct the processing system to:
access a user profile for the user; and
identify the portion based on the user profile.

16. The apparatus of claim 13, wherein the program instructions direct the processing system to:
after identifying the portion, insert predefined text input into a chat channel of the communication session.

17. The apparatus of claim 13, wherein the program instructions direct the processing system to:
after identifying the portion, synthesize speech from predefined text input and play the speech over the communication session.

18. The apparatus of claim 13, wherein to notify the user, the program instructions direct the processing system to:
produce a sound and/or vibration for the user.

19. The apparatus of claim 13, wherein the program instructions direct the processing system to:
after notifying the user, receive input from the user for inclusion in the user communications, wherein the input comprises text or a voice recording; and
include the input in the user communications in real time with the receipt of the input.

20. One or more computer readable storage media having program instructions stored thereon that, when read and executed by a processing system, direct the processing system to:
identify a meeting for an automated attendee to attend on behalf of a user;
at a time for the meeting, join the automated attendee to a communication session for the meeting;
monitor, in real-time, user communications exchanged between two or more other users over the communication session;
generate a transcript of the user communications;
provide the transcript to the user; and
during the monitoring, upon identifying a portion of the user communications that is relevant to the user, notify the user about the portion, including highlighting the portion to the user in real-time within the transcript.

* * * * *